March 19, 1968   W. E. R. WATT ETAL   3,373,479
METHOD FOR MAKING MOLDED ARTICLES
Filed March 25, 1965

INVENTORS.
William E. R. Watt &
Eldrich J. Willis

Robert L. Teeter
ATTORNEY

United States Patent Office 3,373,479
Patented Mar. 19, 1968

3,373,479
METHOD FOR MAKING MOLDED ARTICLES
William E. R. Watt, New Kensington, and Eldrich J. Willis, Bridgeville, Pa., assignors to Aluminum Company of America, Pittsburgh, Pa., a corporation of Pennsylvania
Filed Mar. 25, 1965, Ser. No. 442,728
4 Claims. (Cl. 29—421)

ABSTRACT OF THE DISCLOSURE

Molding an article by radially expanding a collet to form a continuous bead seal against the wall of a mold cavity and, after introducing moldable material into the cavity, retracting the collet to permit removal of the article.

---

This invention relates generally to a method and apparatus for manufacturing articles having at least a portion thereof composed of a moldable material.

It is an object of this invention to provide a method for obtaining an effective seal against flow of the moldable material from the mold cavity, with a minimum of mold and die components.

It is another object of this invention to provide a means of obtaining such a seal through cooperation of a collapsible die member with a mold member.

It is another object of this invention to provide a method for coating a liner shell with a precise quantity of moldable material in a simple manner.

It is a further object of this invention to provide a method of producing an article having an interior liner shell of deformable material and an exterior cover of moldable material, wherein an effective seal is obtained through cooperation between a collapsible die member, the liner shell and a mold member.

It is yet another object of this invention to attain the above-mentioned objectives in a method for making an article composed entirely of a moldable material.

Other objects and advantages of the invention will be understood from the following description of the invention, on reference to the illustrations appended hereto, in which.

Where specific illustrations are deemed helpful, reference will be made to the manufacture of closures. It will be apparent, however, that the invention is not so narrowly limited and numerous other types of molded articles may be manufactured by means of the method and apparatus of this invention.

Figure 1:
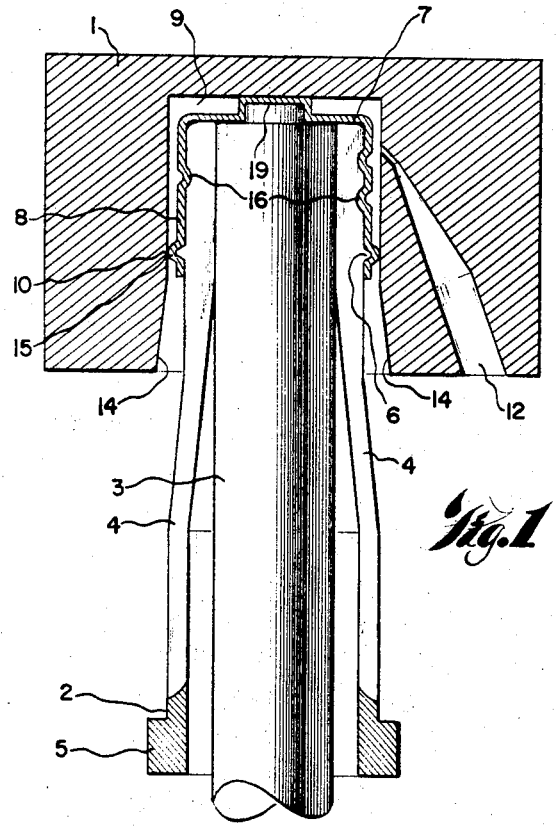
FIG. 1 is a sectional view of one form of apparatus embodying the principles of this invention.

Referring now in greater detail to the drawings, FIG. 1 shows a mold 1 having a substantially cylindrical mold cavity 9. Disposed within the mold cavity 9 is a liner shell 7 having an annular raised panel portion 19, the shell 7 being made from a deformable material which may conveniently be metal or plastic. The interior of the shell 7 is in contact with a radially expanded elongated collapsible die or collet 2. The die or collet is substantially cylindrical, extending upwardly from an annular retaining ring 5 at its base, with the upper portion divided into a plurality of radially flexible tines 4. Each tine has a recessed thread segment and a projecting bead segment which upon expansion of the collet cooperate with similar segments on the other tines to provide a continuous thread 16 and a continuous sealing bead 6. The tines of the die are urged radially outwardly by means of an axially reciprocating actuating pin or plunger 3. When the actuating plunger 3 is in its fully extended position, the die 2 is in its expanded position, with the tines 4 radially expanded, thereby causing annular sealing bead 6 of the die to press outwardly on bead 15 of liner skirt 8, which bead in turn bears on the mold 1 at the annular sealing line 10. A pinch off seal of the mold cavity 9 is thus created between the mold 1 and the bead 15 by the radially directed outward force of the expanding collet 2, which force is transmitted to the sealing area by the collet bead 6.

It will be appreciated that no movement of any mold member is required to effect a seal and that the axial movement of the collet has ceased before radial expansion of the tines is initiated. Only the radially outward movement of the tines 4 is required. It is, however, important that the collet be in its final axial position before expansion occurs in order that the resultant annular seal line 10 is in the proper axial position.

In manufacturing a molded article such as a closure, a liner shell 7 may be inserted into the mold cavity 9. The collet 2, in collapsed position, with its tines radially contracted, may be axially inserted into the shell 7. The actuating pin or plunger 3 may then be extended axially into the collapsed collet thereby forcing the tines 4 radially outward in such a manner that when the plunger 3 reaches its deepest penetration, the collet will be fully expanded and a pinch off seal formed at sealing line 10. Moldable material 11 is introduced under pressure into the mold cavity 9 through gate or orifice 12. The material 11 is under sufficient pressure to cause the shell 7 to be reformed into the threaded exterior configuration of the expanded collet 2. The mold cavity seal created by the expansion of the collet 2 prevents the flow of the liquid material under pressure beyond sealing line 10. After the moldable material has solidified, the actuating pin 3 is withdrawn and the collet collapses inwardly. The die may be removed and the mold may then be opened to permit removal of the completed closure.

As the seal along sealing line 10 is created by the outwardly directed force of the collet 2 transmitted through the collet bead 6, the extent to which the shell skirt 8 is covered by moldable material 11 may be changed without altering the mold 1 or mold cavity 9 in any manner. This is easily accomplished by employing a collet having a bead disposed in a different axial position. In the embodiment shown in FIGURE 2, in which a slightly different form of liner shell panel and mold gate 12 are illustrated, the collet bead exerts an outward force transmitted through shell bead 15 to stripper plate 13 thereby creating sealing line 17. The selection of mold member against which the sealing line 10 is established is not critical and will depend upon the extent to which the liner shell skirt 8 is to be covered by the moldable material, as this will determine the axial disposition of the collet bead 6. What is important is that radial expansion of the collet, after all axial collet movement has terminated, cooperates directly, or indirectly through a liner shell, to create the seal against the wall of a stationary mold member. No additional mold members need be inserted or engaged to establish the seal.

The shell bead 15 may be formed by the outward movement of the collet 2 or optionally may be preformed and adapted to be engaged by the collet bead 6. As the outward radial force exerted by the collet bead 6 is sufficient to form such a bead, a shell preforming step may conveniently be eliminated.

Figure 2:
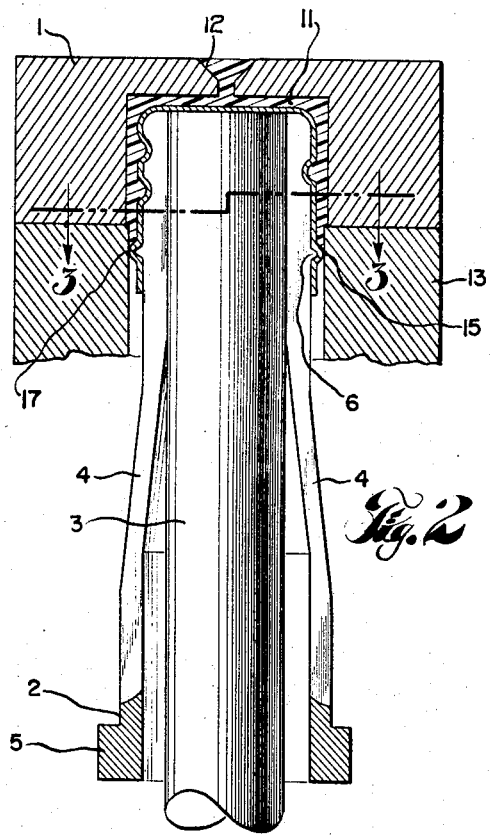
FIG. 2 is similar to FIG. 1, but shows a modified form of apparatus after moldable material has been introduced into the sealed mold cavity.
Figure 3:
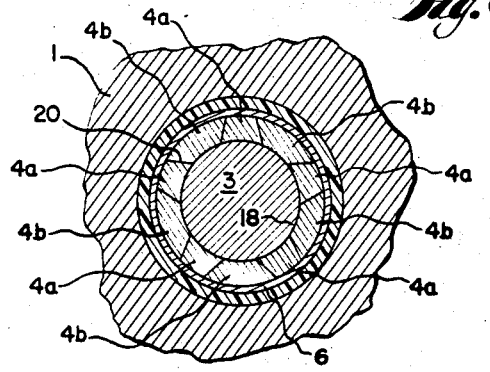
FIG. 3 is a sectional view taken through 3—3 of FIG. 2, showing the collapsible die or collet in expanded position.
Figure 4:
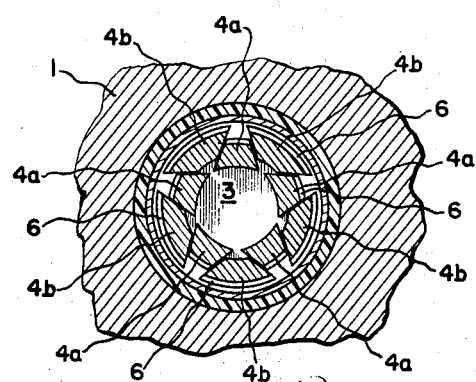
FIG. 4 is similar to FIG. 3, but shows the die in collapsed position.

FIGURE 3, which is a sectional view taken through 3—3 of FIGURE 2, shows a collet in expanded position, while FIGURE 4 is a similar view showing a collet in collapsed position. The collet 2 in collapsed position has alternating internally disposed tines 4a and outwardly disposed tines 4b. As the actuating pin is moved into the collet, the internally disposed tines 4a are moved radially outwardly and cause outwardly radial movement as well as some circumferential movement of the external tines 4b. When the collet is in the expanded position, the pin operates as a collet sealing means to create an annular seal 18 betwen the periphery of pin or plunger 3 and the interior face of the tines 4. Also, seals 20 are created by cooperation of the tines, which when the collet is expanded, have adjacent tines faces in frictional engagement with one another to provide a tight wedge fit.

The dimensions of the collet bead 6 need not be precise. We have found that a relatively small gap between the collet bead 6 (or liner shell bead 15 if a shell is used) and the mold 1, stripper plate 13 or other mold member, can be tolerated. Such a gap does not result in seal failure with a moldable material of viscosity normally employed in such articles. Also, the collet bead may be allowed to penetrate into the liner shell without detrimental effect.

Figure 5:
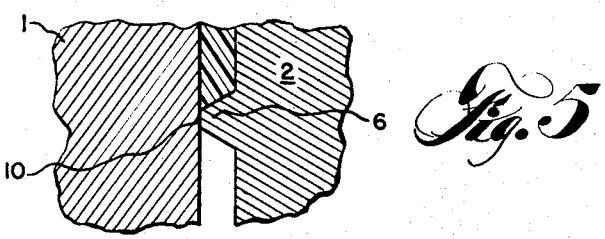
FIG. 5 is a fragmentary enlarged sectional view of a seal obtained between a collapsible die member and mold member.

As seals 18, 19 effectively seal the collet in expanded condition, against entry of a moldable material into the collet interior, an article composed entirely of a moldable material may be made employing this apparatus. An effective side seal is obtained by cooperation between annular collet bead 6 and the mold 1, stripper plate 13 or other mold member. FIGURE 5 illustrates an enlarged sectional view of a sealing line 10 obtained by cooperation between the collet bead 6 and mold 1. The operation of the apparatus is otherwise the same as when a liner shell is present, except that a threaded article, such as a closure, may be produced without the moldable material being introduced into the mold cavity at the elevated pressure needed for shell deformation. This invention, therefore, facilitates the manufacture of an article composed entirely of a moldable material.

It will be appreciated that where a liner shell is employed, the depth and area covered by the moldable material may be accurately controlled by the apparatus and method of this invention. Should it be desired to form an exterior shell over only the panel portion of the liner shell, the panel portion plus a small portion of the skirt, or only the skirt, these objectives may be readily accomplished. All of these types of articles may be produced by use of this invention without the need for modification of the mold members.

In the embodiment shown in FIGURE 1, the mold has an annular beveled edge 14 which provides an angular entry to facilitate placement of a beaded liner shell 7 into the mold cavity 9 without damage to the shell or undesired cocking within the cavity. It also serves as a guide to cause the shell to be centered within the cavity and assure subsequent interference free entrance of the collet 2 into the shell 7 as well as proper registry between the collet bead 6 and liner bead 15.

The interior shell may conveniently be composed of any suitable deformable material or laminate or common liner materials such as aluminum or tin plate. The moldable material may be any material having desired thermal and adherence properties, such as a thermoplastic or thermosetting material. As the essence of this invention resides in the use of a collapsible die of specific configuration to obtain an effective seal, it is obvious that the selection of material of which the molded article is to be manufactured is by no means critical.

While throughout this disclosure an actuating pin or plunger 3 has been discussed for purposes of illustration as the collet operating means, it is apparent that the means selected is not critical and other means of collet operation will be obvious to those skilled in the art. Any means for causing the collet to expand and collapse is sufficient. A pin or plunger may, for example, be tubular, hollow or piston shaped rather than of the solid cylindrical form shown in the drawings. It may be made from any suitable material such as metal or rubber, for example. The driving means for direct or indirect operation of the collet may be any conventional means such as mechanical, hydraulic or pneumatic. In those instances where an article is to be made entirely from a moldable material, the upper portion of the collet operating means should provide annular seal 18.

The precise cross-sectional configuration of the collet bead 6 may be varied substantially without loss of the beneficial sealing properties taught by this invention. All that is required is that the bead be adapted to cooperate with a mold member, either directly or through a liner shell, to establish a seal when an outward radial force is applied to the collet tines 4. The configuration may conveniently be substantially round or arcuate as illustrated in FIGURES 1 and 2 or substantially frusto-conical as shown in FIGURE 5, for example. Bead configurations having a substantially flat outer bearing surface such as a frustoconical bead do, however, provide the advantage of a sealing line having some width. This could be beneficial in creating a seal against a mold member having dimensional irregularities.

While some of the specific illustrations discussed herein have referred to the continuous die or collet bead as being annular, the invention is not so limited. It may be desirable, for decorative or other purposes, to provide the lower edge of the moldable material with an irregular shape. Such configurations may be obtained with this invention so long as the bead, regardless of its configuration, is continuous when the collet is in its expanded position and adapted to establish a mold cavity seal through cooperation with a mold member.

While the specific examples contained herein all relate to threaded closures, the invention when employed in the manufacture of closures is not so limited. Snap-on as well as lug type closures may be manufactured by means of the method and apparatus of this invention by use of a collet designed accordingly.

Whereas particular embodiments of the invention have been described above for purposes of illustration, it will be evident to those skilled in the art that numerous variations of the details may be made without departing from the invention as defined in the appended claims.

We claim:
1. A method of manufacturing a molded article which comprises:
   (a) providing in a mold cavity a retracted collapsible collet, said collet being formed of a plurality of relatively moving segments so that when it is radially expanded, the segments are forced into alignment to form a continuous outwardly disposed surface and so that beads on said segments are aligned to form a continuous bead around the periphery of said collet;
   (b) radially expanding said collet to form said continuous bead and force said bead against the wall of said mold cavity, thereby forming a seal between said collet and said cavity;
   (c) introducing moldable material into said sealed mold cavity; and
   (d) subsequently radially retracting said collapsible collet to permit removal of said article.

2. A method of manufacturing a molded article which comprises:
   (a) providing a deformable liner shell having a preformed annular bead in a mold having a mold cavity;
   (b) providing in said mold cavity and said shell, a retracted collapsible collet, said collet being formed of a plurality of relatively moving segments so that when it is radially expanded, the segments are forced into alignment to form a continuous outwardly disposed surface and so that beads on said segments are aligned to form a continuous bead around the periphery of said collet;

(c) radially expanding said collet to form said continuous bead and cause said continuous bead to engage said shell bead, thereby forming a seal between said collet and said cavity;

(d) introducing moldable material into said mold cavity; and (e) subsequently radially retracting said collapsed collet to facilitate removal of said article.

3. A method of manufacturing a molded closure which comprises:

(a) providing a metal liner shell in a mold having a substantially cylindrical mold cavity;

(b) providing in said mold cavity and said shell a retracted collapsible collet, said collet being formed of a plurality of relatively moving segments so that when it is radially expanded, the segments are forced into alignment to form a continuous outwardly disposed surface and so that beads in said segments are aligned to form a continuous bead around the periphery of said collet;

(c) radially expanding said collet to form a corresponding bead in said shell and force said corresponding bead against the wall of said mold cavity, thereby forming a seal between said collet and said cavity;

(d) introducing plastic material into said mold cavity in sufficient quantity to cover at least a portion of said shell, and (e) subsequently radially retracting said collapsible collet to permit removal of said closure.

4. A method of manufacturing a molded closure which comprises:

(a) providing a metal liner shell in a mold having a substantially cylindrical mold cavity;

(b) providing in said mold cavity and said shell a retracted collapsible collet, said collet being formed of a plurality of relatively moving segments so that when it is radially expanded the segments are forced into alignment to form a continuous outwardly disposed surface and so that beads and recessed threads in said segments are aligned to form a continuous bead and thread around the periphery of said collet;

(c) radially expanding said collet to form a corresponding bead and thread in said shell and force said corresponding bead and thread against the wall of said cavity, thereby forming a seal between said collet and said cavity;

(d) introducing plastic material into said mold cavity in sufficient quantity to cover at least a portion of said shell and under sufficient pressure to conform said shell to the configuration of said continuous bead and thread, and (e) subsequently radially retracting said collapsible die to permit removal of said closure.

References Cited

UNITED STATES PATENTS

| | | | |
|---|---|---|---|
| 2,580,816 | 1/1952 | Morin | 264—328 X |
| 3,247,548 | 4/1966 | Fields | 264—313 X |
| 2,222,755 | 11/1940 | Watson | 264—275 X |
| 3,241,845 | 3/1966 | Smith. | |
| 3,125,801 | 3/1964 | Fields | 29—421 |

ROBERT F. WHITE, *Primary Examiner.*

R. B. MOFFITT, J. H. SILBAUGH, *Assistant Examiners.*